(12) United States Patent
Wang et al.

(10) Patent No.: US 7,685,305 B2
(45) Date of Patent: Mar. 23, 2010

(54) MEDIA CODING FOR LOSS RECOVERY WITH REMOTELY PREDICTED DATA UNITS

(75) Inventors: Albert Szu-Chi Wang, Kirkland, WA (US); Ming-Chieh Lee, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1108 days.

(21) Appl. No.: 11/170,281

(22) Filed: Jun. 28, 2005

(65) Prior Publication Data

US 2005/0237987 A1 Oct. 27, 2005

Related U.S. Application Data

(63) Continuation of application No. 11/088,696, filed on Mar. 22, 2005, which is a continuation of application No. 10/329,107, filed on Dec. 23, 2002, now Pat. No. 6,912,584, which is a continuation of application No. 09/267,563, filed on Mar. 12, 1999, now Pat. No. 6,499,060.

(51) Int. Cl.
*G06F 15/16* (2006.01)

(52) U.S. Cl. ..................................................... 709/231

(58) Field of Classification Search .......... 709/230–237
See application file for complete search history.

(56) References Cited

U.S. PATENT DOCUMENTS 4,838,685 A 6/1989 Martinez et al.

(Continued)

FOREIGN PATENT DOCUMENTS

EP 0579319 1/1994

(Continued)

OTHER PUBLICATIONS

"DivX Multi Standard Video Encoder," 2 pp. (Downloaded from the World Wide Web on Jan. 24, 2006).

(Continued)

*Primary Examiner*—Benjamin R Bruckart
*Assistant Examiner*—Alicia Baturay
(74) *Attorney, Agent, or Firm*—Klarquist Sparkman, LLP

(57) ABSTRACT

An improved loss recovery method for coding streaming media classifies each data unit in the media stream as an independent data unit (I unit), a remotely predicted unit (R unit) or a predicted data unit (P unit). Each of these units is organized into independent segments having an I unit, multiple P units and R units interspersed among the P units. The beginning of each segment is the start of a random access point, while each R unit provides a loss recovery point that can be placed independently of the I unit. This approach separates the random access point from the loss recovery points provided by the R units, and makes the stream more impervious to data losses without substantially impacting coding efficiency. The most important data units are transmitted with the most reliability to ensure that the majority of the data received by the client is usable. The I units are the least sensitive to transmission losses because they are coded using only their own data. While they provide the best coding efficiency, the P units are the most sensitive to data loss because the loss of one P unit renders useless all of the P units that depend on it. The remotely predicted units are dependent on the I unit, or in an alternative implementation, on another R unit.

22 Claims, 5 Drawing Sheets

U.S. PATENT DOCUMENTS

| | | | |
|---|---|---|---|
| 4,989,087 A | 1/1991 | Pele et al. |
| 5,049,991 A | 9/1991 | Niihara |
| 5,093,720 A | 3/1992 | Krause et al. |
| 5,175,618 A | 12/1992 | Ueda et al. |
| 5,214,504 A | 5/1993 | Toriu et al. |
| 5,227,878 A | 7/1993 | Puri et al. |
| 5,255,090 A | 10/1993 | Israelsen |
| 5,267,334 A | 11/1993 | Normille et al. |
| 5,317,397 A | 5/1994 | Odaka et al. |
| 5,376,968 A | 12/1994 | Wu et al. |
| 5,412,430 A | 5/1995 | Nagata |
| 5,412,435 A | 5/1995 | Nakajima |
| 5,424,779 A | 6/1995 | Odaka et al. |
| RE35,093 E | 11/1995 | Wang et al. |
| 5,467,136 A | 11/1995 | Odaka et al. |
| 5,469,226 A | 11/1995 | David et al. |
| 5,477,272 A | 12/1995 | Zhang et al. |
| 5,481,310 A | 1/1996 | Hibi |
| 5,539,663 A * | 7/1996 | Agarwal .................. 348/406.1 |
| 5,541,594 A | 7/1996 | Huang et al. |
| 5,543,847 A | 8/1996 | Kato |
| 5,546,129 A | 8/1996 | Lee |
| 5,557,684 A | 9/1996 | Wang et al. |
| 5,579,430 A | 11/1996 | Grill et al. |
| 5,592,226 A | 1/1997 | Lee et al. |
| 5,594,504 A | 1/1997 | Ebrahimi |
| 5,598,215 A | 1/1997 | Watanabe |
| 5,598,216 A | 1/1997 | Lee |
| 5,612,743 A | 3/1997 | Lee |
| 5,612,744 A | 3/1997 | Lee |
| 5,617,145 A * | 4/1997 | Huang et al. .............. 348/423.1 |
| 5,619,281 A | 4/1997 | Jung |
| 5,621,660 A | 4/1997 | Chaddha et al. |
| 5,627,591 A | 5/1997 | Lee |
| 5,642,166 A | 6/1997 | Shin et al. |
| 5,668,608 A | 9/1997 | Lee |
| 5,673,339 A | 9/1997 | Lee |
| 5,692,063 A | 11/1997 | Lee et al. |
| 5,699,476 A | 12/1997 | Van Der Meer |
| 5,714,952 A * | 2/1998 | Wada .......................... 341/94 |
| 5,731,850 A | 3/1998 | Maturi et al. |
| 5,740,310 A | 4/1998 | De Haan et al. |
| 5,742,344 A | 4/1998 | Odaka et al. |
| 5,748,121 A * | 5/1998 | Romriell ....................... 341/65 |
| 5,751,360 A | 5/1998 | Tanaka |
| 5,754,233 A | 5/1998 | Takashima |
| 5,784,107 A | 7/1998 | Takahashi |
| 5,784,175 A | 7/1998 | Lee |
| 5,784,528 A | 7/1998 | Yamane et al. |
| 5,822,541 A | 10/1998 | Nonomura et al. |
| 5,825,421 A * | 10/1998 | Tan ........................ 375/240.15 |
| 5,835,144 A | 11/1998 | Matsumura et al. |
| 5,835,149 A | 11/1998 | Astle |
| RE36,015 E | 12/1998 | Iu |
| 5,852,664 A * | 12/1998 | Iverson et al. .................. 705/51 |
| 5,861,919 A | 1/1999 | Perkins et al. |
| 5,867,230 A * | 2/1999 | Wang et al. .............. 348/425.2 |
| 5,870,148 A | 2/1999 | Lillevold |
| 5,880,784 A | 3/1999 | Lillevold |
| 5,946,043 A | 8/1999 | Lee et al. |
| 5,949,489 A | 9/1999 | Nishikawa et al. |
| 5,963,258 A | 10/1999 | Nishikawa et al. |
| 5,970,173 A | 10/1999 | Lee et al. |
| 5,970,175 A | 10/1999 | Nishikawa et al. |
| 5,982,438 A | 11/1999 | Lin et al. |
| 5,986,713 A | 11/1999 | Odaka et al. |
| 5,990,960 A | 11/1999 | Murakami et al. |
| 5,991,447 A | 11/1999 | Eifrig et al. |
| 6,002,439 A | 12/1999 | Murakami et al. |
| 6,002,440 A | 12/1999 | Dalby et al. |
| RE36,507 E | 1/2000 | Iu |
| 6,011,596 A | 1/2000 | Burl et al. |
| 6,026,195 A | 2/2000 | Eifrig et al. |
| 6,029,126 A | 2/2000 | Malvar |
| 6,052,150 A | 4/2000 | Kikuchi |
| 6,052,417 A | 4/2000 | Fujiwara et al. |
| 6,057,832 A | 5/2000 | Lev et al. |
| 6,097,759 A | 8/2000 | Murakami et al. |
| 6,104,754 A | 8/2000 | Chujoh et al. |
| 6,104,757 A * | 8/2000 | Rhee ..................... 375/240.12 |
| 6,122,321 A | 9/2000 | Sazzad et al. |
| 6,188,794 B1 | 2/2001 | Nishikawa et al. |
| 6,243,497 B1 | 6/2001 | Chiang et al. |
| 6,249,318 B1 | 6/2001 | Girod et al. |
| 6,307,973 B2 | 10/2001 | Nishikawa et al. |
| 6,324,216 B1 | 11/2001 | Igarashi et al. |
| 6,370,276 B2 | 4/2002 | Boon |
| 6,373,895 B2 | 4/2002 | Saunders et al. |
| 6,400,990 B1 | 6/2002 | Silvian |
| 6,408,029 B1 | 6/2002 | McVeigh et al. |
| 6,415,055 B1 | 7/2002 | Kato |
| 6,415,326 B1 | 7/2002 | Gupta et al. |
| 6,441,754 B1 | 8/2002 | Wang et al. |
| 6,499,060 B1 * | 12/2002 | Wang et al. .................. 709/231 |
| 6,625,215 B1 | 9/2003 | Faryar et al. |
| 6,640,145 B2 | 10/2003 | Hoffberg et al. |
| 6,704,360 B2 | 3/2004 | Haskell et al. |
| 6,912,584 B2 * | 6/2005 | Wang et al. .................. 709/231 |
| 7,006,881 B1 | 2/2006 | Hoffberg et al. |
| 7,242,716 B2 | 7/2007 | Koto et al. |
| 7,512,698 B1 | 3/2009 | Pawson |
| 7,545,863 B1 | 6/2009 | Haskell et al. |
| 2002/0097800 A1 | 7/2002 | Ramanzin |
| 2002/0113898 A1* | 8/2002 | Mitsuhashi ................. 348/578 |
| 2002/0114391 A1 | 8/2002 | Yagasaki et al. |
| 2002/0126754 A1 | 9/2002 | Shen et al. |
| 2003/0099292 A1 | 5/2003 | Wang et al. |
| 2003/0138150 A1 | 7/2003 | Srinivasan |
| 2003/0156648 A1 | 8/2003 | Holcomb et al. |
| 2003/0202586 A1 | 10/2003 | Jeon |
| 2004/0013308 A1 | 1/2004 | Jeon et al. |
| 2004/0066848 A1 | 4/2004 | Jeon et al. |
| 2004/0131267 A1 | 7/2004 | Adiletta et al. |
| 2005/0123274 A1 | 6/2005 | Crinon et al. |
| 2005/0135484 A1 | 6/2005 | Lee et al. |
| 2005/0147167 A1 | 7/2005 | Dumitras et al. |
| 2005/0193311 A1 | 9/2005 | Das et al. |
| 2006/0210181 A1 | 9/2006 | Wu et al. |
| 2007/0205928 A1 | 9/2007 | Chujoh et al. |

FOREIGN PATENT DOCUMENTS

| | | |
|---|---|---|
| EP | 0612156 | 4/1994 |
| EP | 0614318 | 9/1994 |
| EP | 0707425 | 10/1994 |
| EP | 0625853 | 11/1994 |
| JP | 5130595 | 5/1993 |
| JP | 6030394 | 2/1994 |
| JP | 6078298 | 3/1994 |
| JP | 10164600 | 6/1998 |
| JP | 11150731 | 6/1999 |
| JP | 2000152247 | 5/2000 |
| WO | WO 91/11782 | 8/1991 |
| WO | WO 97/05746 | 2/1997 |

OTHER PUBLICATIONS

ISO/IEC, "JTC1/SC29/WG11 N2202, Information Technology—Coding of Audio-Visual Objects: Visual, ISO/IEC 14496-2," 329 pp. (1998).

ITU-T, "ITU-T Recommendation H.261, video Codec for Audiovisual Sesrvices at p × 64 kbits," 25 pp. (1993).

ITU-T, "ITU-T Recommendation H.262, Information Technology—Generic Coding of Moving Pictures and Associated Audio Information: Video," 205 pp. (1995).

Joint Video Team (JVT) of ISO/IEC MPEG & ITU-T VCEG, "Joint Final Committee Draft (JFCD) of Joint Video Specification," JVT-D157, 207 pp. (Aug. 2002).

Kim et al., "Low-Complexity Macroblock Mode Selection for H.264/AVC Encoders," *IEEE Int. Conf. on Image Processing*, 4 pp. (Oct. 2004).

Microsoft Corporation, "Microsoft Debuts New Windows Media Player 9 Series, Redefining Digital Media on the PC," 4 pp. (Sep. 4, 2002) [Downloaded from the World Wide Web on May 14, 2004].

Mook, "Next-Gen Windows Media Player Leaks to the Web," *BetaNews*, 17 pp. (Jul. 2002) [Downloaded from the World Wide Web on Aug. 8, 2003].

Sullivan et al., "The H.264/AVC Advanced Video Coding Standard: Overview and Introduction to the Fidelity Range Extensions," 21 pp. (Aug. 2004).

Wien, "Variable Block-Size Transforms for Hybrid Video Coding," Dissertation, 182 pp. (Feb. 2004).

International Organization for Stadardisation ISO/IEC JTCI/SC29/WG11, Information Technology-Coding of Audio-Visual Objects: Visual, ISO/IEC 14496-2, Mar. 1998, pp. vii-xiii, 14-23, 30-37, and 192-225.

Chang et al., "Next Generation Content Representation, Creation, and Searching for New-Media Applications in Education," *Proc. IEEE*, vol. 86, No. 5, pp. 884-904 (1998).

Cote et al., "Effects of Standard-compliant Macroblock Intra Refresh on Rate-distortion Performance," ITU-T, Study Group 16, Question 15, 2 pp. (Jul. 1998).

Farber et al., "Robust H.263 Compatible Video Transmission for Mobile Access to Video Servers," *Proc. Int. Conf. Image Processing*, 4 pp. (1997).

Gibson et al., *Digital Compression of Multimedia*, Chapter 10, "Multimedia Conferencing Standards," pp. 309-362 (1998).

Gibson et al., *Digital Compression of Multimedia*, Chapter 11, "MPEG Compression," pp. 363-418 (1998).

Hotter, "Optimization and Efficiency of an Object-Oriented Analysis—Synthesis Coder," *IEEE Transactions on Circuits and Systems for Video Technology*, vol. 2, pp. 181-194 (Apr. 1994).

IBM Technical Disclosure Bulletin, "Method to Deliver Scalable Video Across a Distributed Computer Systems," vol. 37, No. 5, pp. 251-256 (May 1994).

Irani et al., "Video Indexing Based on Mosaic Representations," *Proc. IEEE*, vol. 86, No. 5, pp. 905-921 (May 1998).

ISO/IEC, 11172-2, "Information Technology—Coding of Moving Pictures and Associated Audio for Digital Storage Media at up to about 1.5 Mbit/s—Part 2: Video," pp. i-ix and 1-113 (Aug. 1993).

ISO/IEC JTC1/SC29/WG11, N2459, "Overview of the MPEG-4 Standard," 56 pp. (Oct. 1998).

ISO, ISO/IEC JTC1/SC29/WG11 MPEG 97/N1642, "MPEG-4 Video Verification Model Version 7.0 3. Encoder Definition," pp. 1, 17-122, Bristol (Apr. 1997).

ITU-T, "ITU-T Recommendation H.263 Video Coding for Low Bit Rate Communication," 162 pp. (Feb. 1998).

ITU-T, Draft Recommendation H.263, "Video Coding for Low Bitrate Communication," 51 pp. (Dec. 1995).

Karczewicz et al., "The PS- and SI-Frames Design for H.264/AVC," *IEEE Trans. On Circuits and Systems for Video Technology*, vol. 13, No. 7, pp. 637-644 (2003).

Le Gall, "MPEG: A Video Compression Standard for Multimedia Applications," *Communications of the ACM*, vol. 34, No. 4, pp. 47-58 (Apr. 1991).

Lee et al., "A Layered Video Object Coding System Using Sprite and Affine Motion Model," *IEEE Transactions on Circuits and Systems for Video Technology*, vol. 7, No. 1, pp. 130-145 (Feb. 1997).

Microsoft Corporation and RealNetworks, Inc., "Advanced Streaming Format (ASF) Specification," pp. 1-56 (Feb. 26, 1998).

Microsoft Corporation, "Windows Media Technologies: Overview—Technical White Paper," pp. 1-16 (Month unknown, 1998).

Pennebaker et al., "JPEG Image Data Compression Standard," Chapter 20, pp. 325-329 (1993).

Rui et al., "Digital Image/Video Library and MPEG-7: Standardization and Research Issues," *ICASSP* (1998).

Sullivan, "Draft for 'H.263++' Annexes U, V, and W to Recommendation H.263," ITU-T, Study Group 16, Question 15, 46 pp. (Nov. 2000).

Wang et al., "Error Control and Concealment for Video Communication: A Review," *Proc. IEEE*, vol. 86, No. 5, pp. 974-997 (May 1998).

Wenger et al., "Intra-macroblock Refresh in Packet (Picture) Lossy Scenarios," ITU-T, Study Group 16, Question 15, 3 pp. (Jul. 1998).

Wenger et al., "Simulation Results for H.263+ Error Resilience Modes K, R, N on the Internet," ITU-T, Study Group 16, Question 15, 22 pp. (Apr. 1998).

Wiegand et al., "Block-Based Hybrid Coding Using Motion Compensated Long-Term Memory Prediction," *Picture Coding Symposium*, No. 143, pp. 153-158 (Sep. 1997).

Wiegand et al., "Fast Search for Long-Term Memory Motion-Compensated Prediction," *Proc. ICIP*, vol. 3, pp. 619-622 (Oct. 1998).

Wiegand et al., "Motion-Compensating Long-Term Memory Prediction," *Proc. ICIP*, vol. 2, pp. 53-56 (Oct. 1997).

Wiegand, "Multi-frame Motion-Compensated Prediction for Video Transmissions," Shaker Verlag, 141 pp. (Sep. 2001).

Yu et al., "Two-Dimensional Motion Vector Coding for Low Bitrate Videophone Applications," *Proc. Int'l Conf. on Image Processing*, pp. 414-417 (1995).

Borgwardt, "Core Experiment on Interlaced Video Coding," ITU Study Group 16 Question 16, VCEG-N85, 10 pp. (Oct. 2001).

* cited by examiner

I — INDEPENDENT DATA UNIT
P — PREDICTED DATA UNIT

I — INDEPENDENT DATA UNIT
P — PREDICTED DATA UNIT
R — REMOTELY PREDICTED DATA UNIT

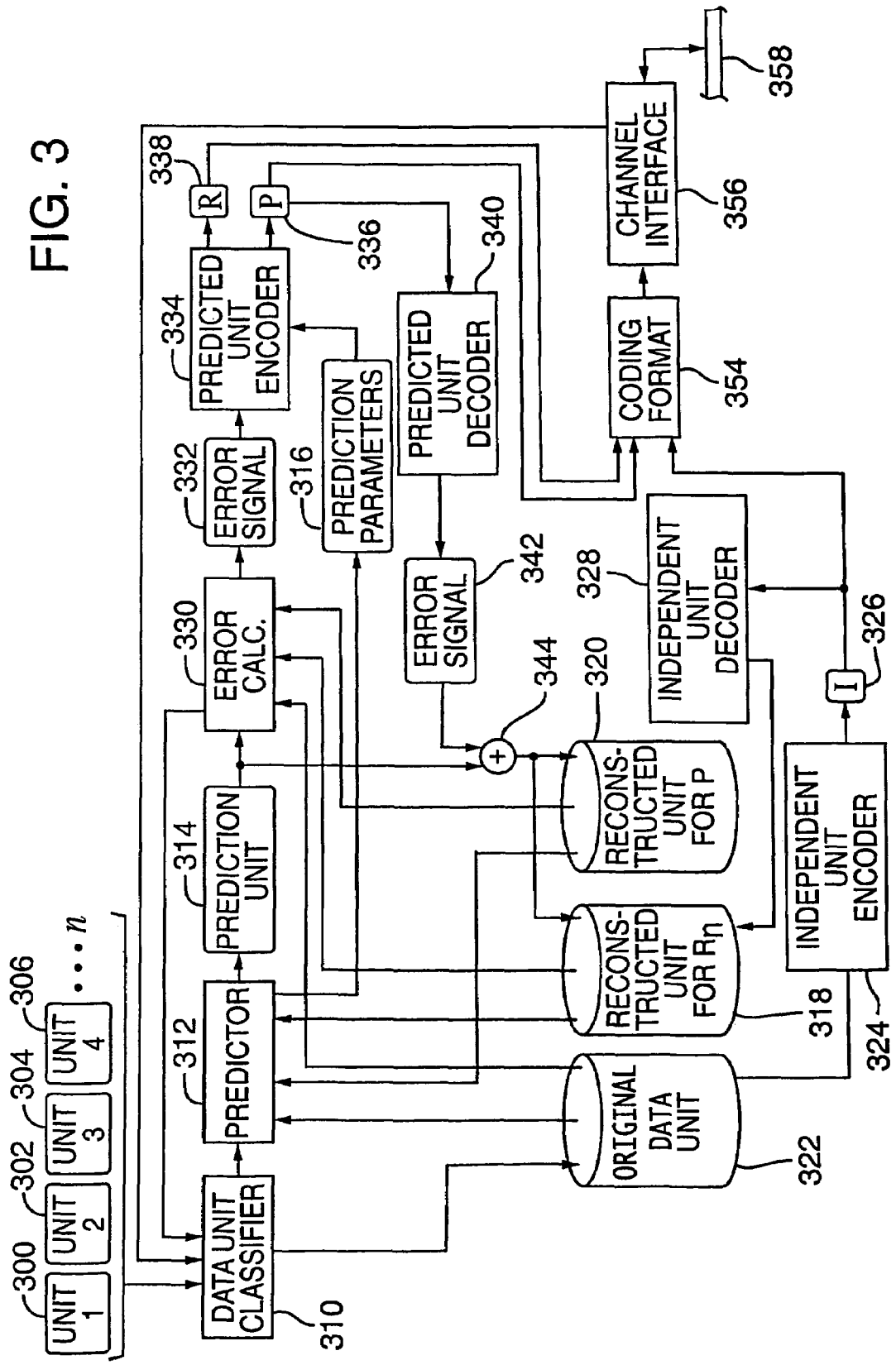

MEDIA CODING FOR LOSS RECOVERY WITH REMOTELY PREDICTED DATA UNITS

RELATED APPLICATION INFORMATION

This is a continuation of U.S. patent application Ser. No. 11/088,696, filed Mar. 22, 2005, which is a continuation of U.S. patent application Ser. No. 10/329,107, filed Dec. 23, 2002, now U.S. Pat. No. 6,912,584 which is a continuation of U.S. patent application Ser. No. 09/267,563, filed Mar. 12, 1999, now U.S. Pat. No. 6,499,060 the disclosures of which are hereby incorporated by reference.

FIELD OF THE INVENTION

The invention relates to the coding of streaming media, and in particular, relates to loss recovery in streaming media applications.

BACKGROUND OF THE INVENTION

Streaming media is a form of data transfer typically used for multimedia content such as video, audio, or graphics, in which a transmitter sends a stream of data so that a receiver can display or playback the content in real time. When multimedia content is streamed over a communication channel, such as a computer network, playback of the content becomes very sensitive to transmission delay and data loss. If the data does not arrive reliably or bandwidth on the client falls below an acceptable minimum, playback of the content is either delayed or discontinued. The rate of data transfer (e.g., the bit rate) required to achieve realistic output at the receiver depends on the type and size of the media being transmitted.

In a typical application of streaming media, a server transmits one or more types of media content to a client. Streaming media is becoming more prevalent on the World Wide Web, where server computers deliver streaming media in the form of network data packets over the Internet to client computers. While multimedia data transfer over computer networks is a primary application of streaming media, it is also used in other applications such as telecommunications and broadcasting. In each of these applications, the transmitter sends a stream of data to the receiver (e.g., the client or clients) over a communication channel. The amount of data a channel can transmit over a fixed period of time is referred to as its bandwidth. Regardless of the communication medium, the bandwidth is usually a limited resource, forcing a trade-off between transmission time and the quality of the media playback at the client. The quality of playback for streaming media is dependent on the amount of bandwidth that can be allocated to that media. In typical applications, a media stream must share a communication channel with other consumers of the bandwidth, and as such, the constraints on bandwidth place limits on the quality of the playback of streaming media.

One way to achieve higher quality output for a given bandwidth is to reduce the size of the streaming media through data compression. At a general level, streaming media of a particular media type can be thought of as a sequential stream of data units. Each data unit in the stream may correspond to a discrete time sample or spatial sample. For example, in video applications, each frame in a video sequence corresponds to a data unit. In order to compress the media with maximum efficiency, an encoder conditionally codes each data unit based on a data unit that will be transmitted to the client before the current unit. This form of encoding is typically called prediction because many of the data units are predicted from a previously transmitted data unit.

In a typical prediction scheme, each predicted data unit is predicted from the neighboring data unit in the temporal or spatial domain. Rather than encoding the data unit, the encoder uses the neighboring data unit to predict the signal represented in the current unit and then only encodes the difference between the current data unit and the prediction of it. This approach can improve the coding efficiency tremendously, especially in applications where there is a strong correlation among adjacent data units in the stream. However, this approach also has the drawback, that a lost data unit will not only lose its own data, but will also render useless all subsequent data units that depend on it. In addition, where a stream of data is converted into a stream of units each dependent upon an adjacent unit, there is no way to provide a random access point in the middle of the stream. As a result, playback must always start from the beginning of the stream.

In order to solve these problems, conventional prediction schemes typically sacrifice some compression efficiency by breaking the stream into segments, with the beginning of each segment coded independently from the rest of the stream. To illustrate this point, consider the typical dependency graph of data units of a media stream shown in FIG. 1.

The dependency graph in FIG. 1 shows the data units in the order that they are located in the input data stream. From left to right, the data units represent an ordered sequence of data units in streaming media. In video coding applications, for example, each of these data units corresponds to a video frame that is encoded, and then transmitted to a receiver for playback.

Conventional prediction schemes classify the data units in the stream as either independent data units (shown marked with the letter I, e.g., 100, 102, and 104) or predicted data units (shown marked with the letter P, e.g., 106-128). The I units are independent in the sense that they are encoded using only information from the data unit itself. The predicted units are predicted based on the similarity of the signal or coding parameters between data units. As such they are dependent on the preceding data unit, as reflected by the arrows indicating the dependency relationship between adjacent data units (e.g., dependency arrows 130, 132, 134, and 136).

Because independent units are encoded much less efficiently than predicted units, they need to be placed as far apart as possible to improve coding efficiency. However, this causes a trade-off between coding efficiency, on the one hand, and data recovery and random access on the other. If a data unit is lost, the predicted units that depend on it are rendered useless. Therefore, independent data units need to be placed closer together to improve data recovery at the sacrifice of coding efficiency. As the independent units are placed closer together, coding efficiency decreases and at some point, the available bandwidth is exceeded. When the bandwidth is exceeded, the quality of the playback of streaming media suffers excessive degradation because the given bandwidth cannot maintain adequate quality with such poor coding efficiency.

Another drawback of the scheme shown in FIG. 1 is that the data recovery points must coincide with the random access points. Even if the need for random access does not force I units closer together, the need for improved data recovery may anyway. As such, the coding scheme lacks the flexibility to treat data recovery and random access separately.

SUMMARY OF THE INVENTION

The invention provides a coding method for streaming media that uses remote prediction to enhance loss recovery. Remote prediction refers to a prediction-based coding method for streaming media in which selected data units are classified as remotely predicted units. The coding method improves loss recovery by using remotely predicted units as loss recovery points and locating them independently of random access points in the data stream. The remotely predicted units improve loss recovery because they depend only on one or a limited number of units located at a remote location in the encoded data stream. As a result they are less sensitive to data loss than a conventional predicted unit, which often depends on multiple data units. The remotely predicted units can be inserted closer together than independent units without substantially decreasing coding efficiency because they have a much higher coding efficiency than independent data units.

One aspect of the invention is a process for classifying the data units in streaming media to enhance loss recovery without significantly decreasing coding efficiency. Typically performed in the encoder, this process classifies data units as independent units (I units), predicted units (P units), or remotely predicted units (R units). Operating on an input stream of data units (e.g., a sequence of video frames), the process groups contiguous sequences of units into independent segments and classifies the data units within each segment so that it includes an I unit, followed by P units, and one or more R units. The R units provide improved loss recovery because they depend only on the I unit in the segment, or alternatively, another R unit. In addition, they are encoded more efficiently than I units because they are predicted from another data unit, as opposed to being coded solely from the unit's own data.

To support remote prediction, an encoder implementation classifies the data units as either I, P, or R type units, and then encodes each differently according to their type. The encoder predicts both the P and R type units from a reference unit, but the reference unit is usually different for these data types. In particular, the R unit is predicted from the I unit in the segment, or alternatively, from another R unit. The P units are predicted from an adjacent unit in the stream (e.g., the immediately preceding data unit). To support both forms of prediction at the same time, the encoder allocates two memory spaces, one each for the reference units used to predict R and P units. In this encoding scheme, the independent segment typically starts with an I unit, which is followed by multiple P units, each dependent on the immediately preceding unit. R units are interspersed in the segment as needed to provide data recovery, while staying within bandwidth constraints.

In the decoder implementation, the decoder identifies the type of data unit, usually based on an overhead parameter embedded in the bit stream, and then decodes the data unit accordingly. Like the encoder, the decoder allocates two memory spaces for storing reference data units, one used to reconstruct the R type units and another to reconstruct P type data units. When the decoder identifies a data unit as an R unit, it reconstructs the original data unit using the I unit for the current segment, or alternatively, a previous R unit. When the decoder identifies a data unit as a P unit, it reconstructs the original data unit using the immediately preceding data unit, which has been previously reconstructed.

A variety of alternative implementations are possible. In particular, the data units, and specifically the R type units, can be classified dynamically based on some criteria derived or provided at run-time, or can be inserted based on a predetermined spacing of R units relative to the P units in a segment. Also, the I, P, and R units can be prioritized for transfer to improve error recovery and make the transmission more robust with respect to data losses. In particular, the data units are preferably prioritized so that I units are transferred with the most reliability, R units the second most reliability, and P units the least.

Further features and advantages of the invention will become apparent with reference to the following detailed description and accompanying drawings.

BRIEF DESCRIPTION OF THE DRAWINGS

FIG. 3 is a block diagram illustrating an encoder that employs the prediction-based coding scheme of the invention.

DETAILED DESCRIPTION

Introduction

The following sections provide a detailed description of a multimedia coding scheme that uses a remotely predicted data unit to enhance loss recovery. The first section begins with an overview of an encoder and decoder implementation. The next section then provides further detail regarding an implementation of the encoder and decoder for video coding applications. Subsequent sections describe methods for classifying the type of data units in an encoded bit stream and prioritizing the transfer of encoded units based on the data unit type.

To illustrate the concept of a remotely predicted data unit, it is helpful to consider a dependency graph of an encoded data stream that uses remotely predicted units. FIG. 2 is a diagram illustrating an example of a dependency graph of a data stream with remotely predicted units. For ease of comparison, it uses the same notation as used for the dependency graph shown in FIG. 1. The coding scheme shown in FIG. 1 places the independent data units approximately five to ten seconds apart for the purposes of loss recovery and random access. However, ideally, it would be preferable to place loss recovery points closer together, e.g., one or two seconds apart, to minimize the impact of a lost data unit. Also, it would be preferable to make the random access points independent of the loss recovery points because independent data units are coded much less efficiently than predicted data units.

Figure 2A:
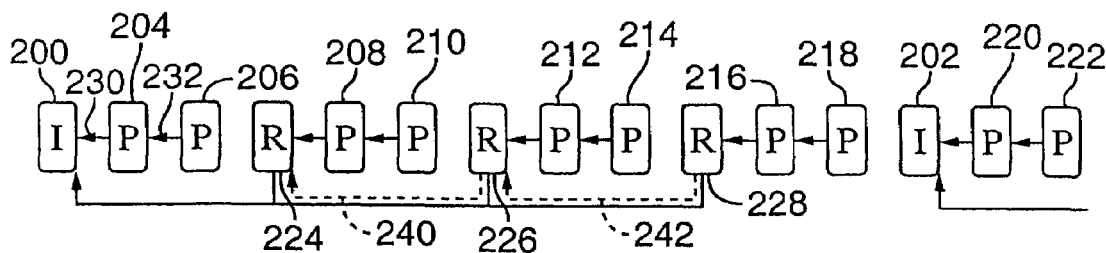
FIGS. 2A-B are diagrams illustrating dependency graphs produced by possible implementations of the invention.

If loss recovery and random access are considered independently, the independent data units can be placed further apart, e.g., ten to fifteen seconds or more, because sufficient random access can still be achieved even when the independent data units are spread further apart. Using remotely predicted data units as loss recovery points, a prediction-based coding scheme can place the loss recovery points nearly independently from the random access points. FIG. 2A shows a dependency graph of an encoded media stream, including independent data units (I, marked with reference numbers 200,202), predicted data units (P, marked with reference numbers 204-222), and remotely predicted data units (R, marked with reference numbers 224-228).

The arrows (e.g., 230, 232) interconnecting the data units in the stream illustrate the dependency relationships among each of the data units. The dependency relationship means that the dependent data units are coded based on some signal attribute of the reference data unit or on the coding parameters of the reference data unit. The independent data units are the first units in independent segments of the stream. For example, the independent data unit labeled 200 is the first data unit of an independent segment spanning from data unit 200 to data unit 218. Also, independent data unit 202 is the start of another independent data segment. Each of the independent data units is encoded using only information from a single, corresponding data unit in the input stream. For example, in a video stream, the data units correspond to image frames, and the independent data units correspond to intra-coded frames, which are coded using solely the content of the corresponding image frame.

As reflected by the arrows (e.g., 230-232) in the dependency graph shown in FIG. 2A, each of the P units are encoded using the immediately adjacent data unit in the data stream. In a temporal stream of data, this dependency relationship means that each of the P units is encoded based on the immediately preceding data unit in the time domain. Depending on the correlation between adjacent units, each of the P units achieves some level of coding efficiency by only encoding the differences between adjacent data units in the series. Each P unit is dependent upon the immediately preceding data unit in the sense that the immediately preceding data unit is needed to compute the differences used to encode it and is also used for reconstructing the original data unit in the decoding process.

The remotely predicted data units (224-228) shown in FIG. 2A are "remote" from the data units that they depend on in the sense that they are not dependent upon the immediately adjacent data unit in the data stream. Instead, they are each dependent upon a remote, non-adjacent data unit, which in this case is the independent data unit at the beginning of the segment. In particular, the encoder codes a data unit classified as an R unit by coding the differences between the data unit and the prediction derived from the independent data unit at the beginning of the segment. In some coding systems, a dependent data unit (R or P type) is dependent in the sense that the dependent data units are coded based on the coding parameters of the reference data unit (e.g., the coding parameters in a parametric model).

While the remotely predicted data units shown in the dependency graph of FIG. 2A are each dependent upon the independent data unit in their segment, it is also possible to make them dependent upon the immediately preceding R unit in the segment. The dashed lines 240, 242 in FIG. 2A show the new dependency relationships for this alternative approach. This alternative approach enhances the encoding efficiency of remotely predicted data units because the differences between R classified units interspersed throughout a segment are likely to be smaller than the differences between these R units and the first data unit in the segment. However, it provides less effective loss recovery since a lost R unit renders the remaining R units in the segment useless in this case.

Figure 1:
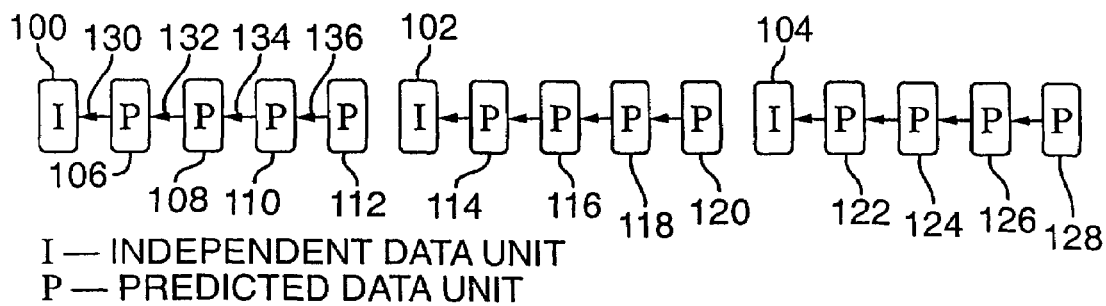
FIG. 1 is a diagram of a typical dependency graph for a conventionally coded media stream.

In the dependency graph shown in FIG. 2A, the random access points still correspond to the placement of independent data units (200, 202), which are now placed further apart relative to the dependency graph of FIG. 1. The remotely predicted data units (224, 226, 228) are placed nearly independently from the independent data units and are placed closer together than the I units to provide better loss recovery. The remotely predicted data units improve loss recovery without significantly reducing coding efficiency because they can be coded more efficiently than independent data units. If more efficiency is desired, remotely predicted units can be predicted from each other, instead of from the independent data unit at the beginning of the segment as noted above.

Figure 2B:
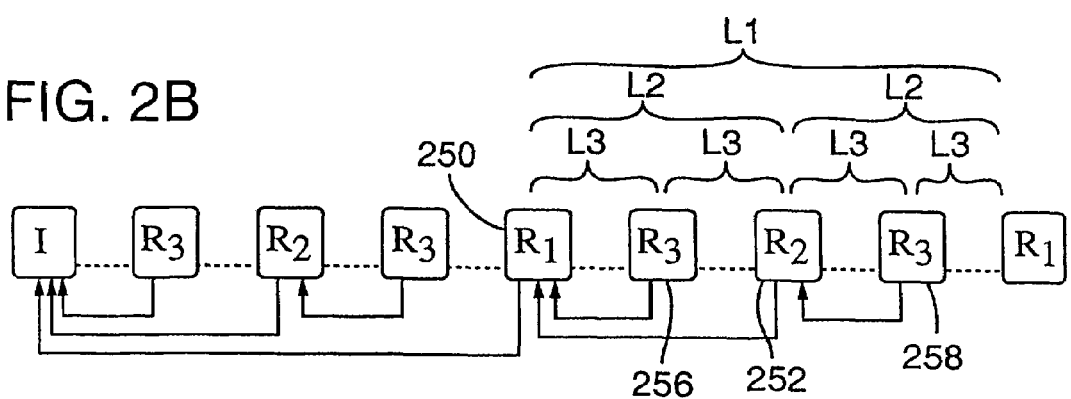

FIG. 2B illustrates another dependency graph with multiple levels of remotely predicted units, each dependent on either the I unit of the current segment or another R unit. In the coding approach illustrated in FIG. 2B, the encoder classifies the incoming stream of data units into multiple layers of dependency. The encoder spaces the I units in roughly the same fashion as shown in FIG. 2B. It spaces multiple levels of R type units such that the frequency of occurrence (e.g., frame rate) of each level of R unit increases with each level. The first level R type unit, $R_1$, is inserted roughly half way between the data units in an independent segment that starts with an I unit. The next level, $R_2$, is inserted so as to double the frame rate of the R type units. Note that the first $R_2$ unit is dependent on the I unit, and then the remainder of the $R_2$ units are dependent on $R_1$ units. The third level, $R_3$, is inserted so as to double the frame rate of K type units relative to the previous level, $R_2$. Note that the $R_3$ type units are dependent on the immediately preceding I or R type unit in the input stream, whichever is closer.

Each R type unit forms the beginning of a sub-segment in which each of the higher level R type units in the sub-segment are dependent on the first unit in the sub-segment. FIG. 2B shows an example of the partitioning of these segments as L1, L2 and L3 in the second half of the independent segment (the same structure also exists on the first half). The data units in each sub-segment are dependent on the first data unit in the sub-segment at that level. For example, all the units in L1 are either directly or indirectly dependent on the $R_1$ unit (250) at the beginning of the segment. The sub-segment L1 contains two sub-segments at the next level, L2. One starts with the $R_1$ unit 250 and another with the R2 unit 252. Each L2 sub-segment further contains two L3 segments. Each of the data units in each L3 sub-segment are dependent on the first data unit in the segment (250, 256, 252, and 258), which is classified as an n−1 or lower level type unit (where n is the level). The dots represent P units that are interspersed among the R type units, each being dependent on the immediately previous data unit. FIG. 2B represents only an example of one possible dependency graph; the actual changes in frame rate from one level to the next as well as the number of levels can vary.

The coding approach shown in FIG. 2B is particularly useful in a transmission scheme where the encoded data units are prioritized. In such a scheme, the I units in a contiguous, sequential portion of the input stream are transmitted first, followed by the $R_1$ units, then the $R_2$ units and finally the $R_3$ units. The server repeats this prioritized transmission for each contiguous portion in sequential order. For example, if a portion is 10 seconds long, the server would send all I units in the first ten second segment, then the $R_1$ units, then the $R_2$ units, and so on. Next it would repeat this process for the second ten second segment. The amount of data sent in each portion depends on the bandwidth available to the client. Because this approach adds latency to the process of rebuilding the data stream on the client, the size of the portion needs to be selected within some tolerable latency constraint on the client.

Each of the R type units provides a loss recovery point that is dependent on some other data unit, either R or I, which is transmitted with higher priority. Thus, if some P type units or even some R type units are lost, the decoder on the receiver only needs to select the next higher level R or I type unit to recover from the loss. This improves loss recovery since the next R type unit is typically a lot closer than the next I unit would be in a conventional loss recovery scheme.

To implement this scheme, the remotely predicted data units encode the level of hierarchy that they reside in, as well as an identifier of their reference unit. The decoder uses the level of hierarchy to determine which data unit is the proper recovery point in the event of data losses, and it uses the identifier of the reference unit to determine which previously reconstructed data unit it will use to reconstruct the current data unit. The identifier may be implicit in the level of hierarchy of the remotely predicted unit. In other words, the decoder may select the immediately preceding R unit in a lower level of hierarchy as the reference unit for the current R type unit. In this context, the phrase, "immediately preceding" refers to the order of the data units in the reconstructed data stream, which corresponds to the original order of the data units at the input to the encoder. The identifier may also explicitly identify a previously decoded data unit (e.g., frame of video) by the number of the reference data unit or an offset identifying the location of the reference frame in the reconstructed sequence of data units.

Media coders that incorporate the above-approach can be designed to insert the remotely predicted units at fixed locations in the data stream, or can place them selectively based on some other criteria. For example, an encoder may allow the user to specify the location of the I and R units as an adjustable input parameter. In addition, the encoder may be programmed to insert R units to improve loss recovery in cases where the media content has higher priority or where data losses are expected. At run-time, a real-time encoder can be programmed to determine when data losses are expected by querying the communication interface for the data rate or for a measure of the data loss incurred for previously transmitted data units.

To mitigate losses, the encoder can be adapted to prioritize the transmission of the different data unit types. Independent data units, under this scheme, have the highest priority, then R units, and finally P units.

Each of these features is elaborated on below.

Encoder Overview

FIG. 3 is a block diagram illustrating an implementation of a prediction-based coder that employs remotely predicted units to improve loss recovery. The encoder shown in FIG. 3 operates on an input stream of contiguous data units (e.g., 300-306) and produces a coded bit stream of the form shown in FIG. 2A or 2B. Before coding the input data stream, a data unit classifier 310 classifies each of the data units in the input sequence as an independent (I), predicted (P), or remotely predicted (R) data unit. As explained in further detail below, the classification of data units can be adjusted as a user specified parameter, or can be determined automatically in the encoder based on the media content, or some indicator of data transmission reliability, such as bit rate, a count of lost data packets, prediction error, etc.

Once classified, a predictor module 312 computes the prediction unit 314 for each of the data units in the input stream that are classified as R or P units. In most applications, the predictor module will use some form of estimation to model the changes between a data unit and the data unit it is dependent on. One concrete example of this form of prediction is motion estimation performed in video based coding to predict the motion of pixels in one video frame relative to a reference video frame. In some applications, the changes between a data unit and the reference data unit may be so small that no estimation is necessary. In these circumstances, the prediction unit 314 is simply the reference data unit. The reference unit is the data unit that the current data unit being encoded is directly dependent on. The arrows connecting data units in FIGS. 2A and 2B illustrate this direct dependency relationship.

If the predictor 312 uses a form of estimation to improve coding efficiency, it produces a set of prediction parameters 316 in addition to the prediction unit 314. These prediction parameters are used to estimate changes between the data unit being decoded and its reference data unit. As shown in the dependency graph of FIG. 2A for example, the reference data unit for each new data unit being decoded is either the I unit at the beginning of the data stream or the immediately preceding data unit. The predictor module uses the I unit to predict the first P unit in the segment and for at least one of the R units in the segment. For all other P type units in the segment, the predictor module uses the immediately preceding data unit in the input stream. The process of computing the prediction unit 314, therefore, requires that there be at least two separate memories allocated: one for storing a reference unit for remote prediction (memory unit 318) and one for storing a reference unit for local prediction of P type units, namely, the immediately preceding data unit (memory unit 320).

If the coding system is implemented to support multi-levels of R units, then the encoder will allocate another memory unit for each level of remotely predicted unit. For example, a first level of remotely predicted units, $R_1$, may be inserted between units classified as I type in the original input stream. Each $R_1$ unit is dependent on the I unit in the segment. A second level of remotely predicted units may be inserted between units classified as $R_1$ such that each of these second level ($R_2$) units is dependent on the $R_1$ or I unit at the beginning of the sub-segment. This multi-level hierarchy may be repeated for each level by interspersing data units $R_n$ in between the data units classified in the immediately preceding level $R_{n-1}$ in the hierarchy, where n represents the level of hierarchy. The default spacing of the units $R_n$ at each level is such that the $R_n$ units are approximately evenly distributed. However, the spacing of R type units may vary at each level as explained in more detail below. Since each unit $R_n$ is dependent on at least the level below it (e.g., level n−1), this scheme requires that a memory unit be allocated for each level.

To reduce coding errors, the predictor module 312 uses a reconstructed version of the reference data unit for prediction rather than a data unit read directly from the input stream. The predictor 312 uses the reconstructed data unit for prediction (either from memory unit 318 or 320, depending on whether or not the prediction is remote). This aspect of the encoder is reflected in FIG. 3 by the data processing path that flows into the locally reconstructed unit 320 for P type units and the reconstructed unit 318 for R type units. Note that this processing path includes an encoding phase followed immediately by a decoding phase to compute the reference data unit stored in memory units 318, 320. Similarly, the encoder includes an independent data unit encoder 324 to encode the independent data unit 328 at the beginning of the stream, and subsequently, an independent unit decoder 326 reconstructs the data unit before using it as a reference for predicting R units (see memory unit 318).

After the prediction stage, the encoder computes the differences between the prediction unit 314 and the data unit that it is dependent on (the reference unit). For example, in video applications, the error calculator 330 computes the differences between each pixel in the predicted image and the corresponding pixel in the reference image, which is either the reconstructed version of the first frame in the sequence or the reconstructed version of the immediately adjacent frame in the sequence. The output of the error calculator 330 is the error signal 332, which is a representation of the differences between the current unit and its predictor.

The data classifier can also use the magnitude of the prediction error to choose coding between R and P type units. In particular, if the prediction error for P units is getting relatively high, it is worthwhile to insert an R unit instead, since it provides better loss recovery without unduly sacrificing fidelity in this case. When the error gets too big for an R type unit, for example, the data classifier should start a new independent segment, starting with a new I type unit. In addition, the encoder may be adapted to compute the prediction error for both an R and P type unit, and then pick the unit type based on which one has the least prediction error.

There are variety of ways of implementing the inter-process communication between the error calculator/predictor module and the data classifier module. For example, the error calculator 330 or predictor 312 can be designed to notify the data classifier when a threshold is exceeded by signaling an event that the data classifier monitors. Alternatively, the data classifier can query the error calculator periodically (e.g., after processing some number of data units in the stream) to check the error level of the most recent R frame. This interaction is reflected in FIG. 3 as an arrow from the error calculator 330 to the data unit classifier 310. Finally, the data classifier may simply be an integral part of the predictor module that selects the type of data unit based on the magnitude of the prediction error relative to a threshold (e.g., for I units) or based on a comparison of the prediction error for P and R type units.

After the error is computed for the current data unit, a predicted unit encoder 334 encodes the error signal 332 and prediction parameters 316 for the unit. The output of this portion of the encoder is either an encoded P type unit 336 or an R type unit 338. Since both of these types of data units share substantially the same format, the same encoder can be used to encode both of them. An example of this type of encoder for video applications is a conventional DCT or wavelet encoder. In this example, the encoder might contain a transform coder, such as a DCT or wavelet coder, to transform the signal into the frequency domain. Next, the encoder would quantize the frequency coefficients, and then perform some form of entropy coding such as Huffman or arithmetic coding on the quantized coefficients.

In most applications, the predicted unit encoder 334 will use some form of indicator such as a parameter or a flag that indicates the type of data unit. This parameter is used to signal the type of data unit being encoded so that the decoder can determine which previously reconstructed data unit to use as the reference data unit and which unit to use as a loss recovery point.

As noted above, the predicted data units are encoded using a reference unit that is already passed through the encoding and decoding phases. This process of reconstructing the reference unit for encoded data is illustrated, in part, as the predicted unit decoder 340. The predicted unit decoder 340 performs the reverse operation of the predicted unit encoder 334 to reconstruct the error signal 342. Continuing the video coding example from above, the predicted unit decoder could be implemented with an inverse entropy coder to convert a stream of variable length codes into quantization indicies, followed by an inverse quantization process and an inverse transform coding method to transform the coefficients back into the spatial domain. In this case, the error signal 342 is different than the error signal 332 from the error calculator 330 because the coding method is a lossy process. After reconstructing this error signal 342, the encoder adds (344) the error signal to the prediction unit 314 to compute the reconstructed unit and stores it in memory unit 318 or 320, depending on whether it is located at a reference point for dependent R or P units. As noted above, the encoder may have multiple different memory units to buffer reference units for R type data units if the encoder is designed to support multi-layered R type coding.

The encoder encodes independent data units using only the data from the single, corresponding data unit from the input stream. As shown in FIG. 3, an independent unit encoder 324 codes the independent unit for the current segment and produces an encoded I unit 326. For video applications, examples of this type of encoder include texture coders such as a DCT or wavelet coder for encoding video frames. For audio applications, this type of encoder may comprise a frequency domain or parametric coder, for encoding audio frames.

As the encoded I, P, and R units are generated by the respective encoders, a coding format module 354 then integrates these encoded units into the coding format. The coding format module 354 organizes each of the encoded I, P, and R units into a prioritized order for transmission as explained in more detail below.

Then depending on the application, the prioritized data may be further formatted into some form of packet or data stream that is specific to the communication channel being used to transmit the data. In FIG. 3, this final stage of data formatting is reflected as the channel interface 356. The channel interface 356 is responsible for placing the data in the form necessary to transmit it over the channel 358. For example, if the data is being transferred over a computer network, the channel interface is a network adapter interface that takes the data from the coding format module 354 and organizes it in data packets compatible with the network communication channel 356. This network interface may be implemented using conventional network protocols such as TCP/IP, and a network driver, e.g. a software driver for a Ethernet network adapter.

In some implementations, the channel interface can provide a measure of the data transfer reliability/available bandwidth that is useful to the data unit classifier 310 for determining where to insert R and I type data units in the stream. The arrow back to the data classifier from the channel interface represents the communication of this information back to the data classifier. The data classifier can get this information, for example, by querying the channel interface via a function call, which returns a parameter providing the desired information.

Figure 4:
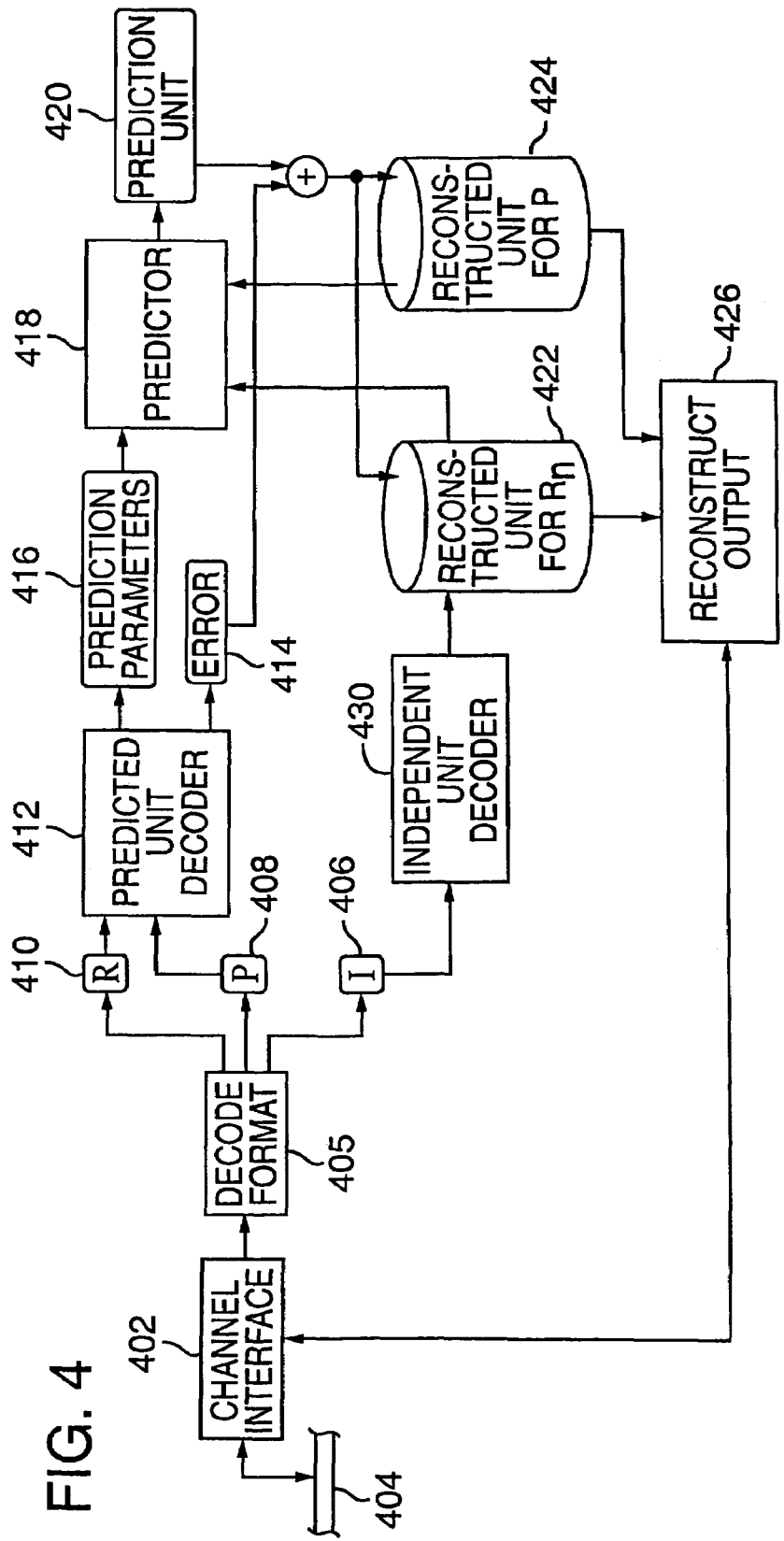
FIG. 4 is a block diagram of a decoder that is compatible with the prediction-based coding scheme shown in FIG. 3.

FIG. 4 is a diagram illustrating a decoder compatible with the encoder shown in FIG. 3. The decoder operates on an encoded media stream from a channel interface 402. The channel interface 402 is responsible for sending and receiving data from a communication channel 404, and is identical to or at least compatible with the channel interface on the transmitter side. For example, in cases where the communication channel is a computer network, the channel interface is a network interface designed to un-package network data packets and place them in a form that they were originally in when submitted to the channel interface on the transmitter side.

The decoding process begins by reading the unpackaged data from the channel interface and breaking it into three different types of encoded data units: independent data units 406, predicted data units 408, and remotely predicted data units 410. The decode format module 405, shown in FIG. 4, is the component responsible for parsing the encoded input stream and sending each data unit to the appropriate decoder. A predicted unit decoder 412 is responsible for decoding both the predicted data unit 408 and the remotely predicted data units 410. The encoding format is similar for both R and P types as explained above, except that the reference unit used for prediction is chosen differently. In addition to decoding the error signal, the predicted unit decoder identifies and decodes the prediction parameters 416 from the encoded data.

The predictor 418 uses the prediction parameters and the previously decoded reference unit to compute the prediction unit 420 for the current data unit being decoded. The predictor 418 computes the prediction unit differently depending on whether the data unit being decoded is an R or P unit. In the case of an R unit, the predictor 418 selects the reference unit for the R unit stored in memory unit 422. For a first-level R unit, $R_1$, this reference unit is the reconstructed I unit for the segment. The decoder allocates sufficient memory units to buffer the reference units for each level of remotely predicted units. For simplicity, the diagram only shows a single memory unit 422, but the implementation may allocate more memory units, depending on the number of levels in the remote prediction scheme. For a P unit, the predictor 418 selects the immediately preceding data unit, which is stored separately from the reference unit for R type units (shown as the reconstructed unit 424 for P type units in FIG. 4). Note, however, a special case exists in that the P unit that immediately follows the first data unit in the segment or the first R type unit in a sub-segment will be predicted from the reference data unit 422, because in this case, it is the immediately preceding data unit. For subsequent data units in the segment, the predictor selects the immediate preceding data unit for P units and selects the R reference unit for remotely predicted units.

After computing the prediction unit 420 for the current data unit being decoded, the decoder combines the error signal 414 with the prediction unit 420 to reconstruct the current data unit. It stores the results in memory 424 allocated separately from the memory allocated for the decoded reference unit 422 for R units because both the decoded R reference unit and the immediately preceding data unit are necessary to decode the segment. With the decoding of each P and R unit, the decoder transfers the preceding data unit currently stored in memory 424 to a module for reconstructing the output (e.g., reconstruct output module 426). It then replaces the reference unit stored in memory 424 with the most recently decoded unit.

The decoder decodes the independent data units using the inverse of the steps performed in the independent unit encoder shown in FIG. 3. These operations are reflected generally as the independent unit decoder module 430 shown in FIG. 4. The decoded independent data unit is stored in memory 422, and as described above, is used to decode the first level R type units in the segment.

The decoder transfers a copy of the independent data unit at the beginning of the stream to the module for reconstructing the output, and replaces the independent data unit in memory 422 with each new independent segment in the stream.

FIGS. 3 and 4 provide a general implementation of a codec that employs remote prediction to improve loss recovery with better coding efficiency. This codec can be incorporated into encoders/decoders for variety of media streams that employ prediction based coding. It is particularly well suited for video coding, and as such, a more detailed description of a video encoder and decoder follow below.

Video Coding Applications

In video coding applications, the stream of data units correspond to a sequence of temporally spaced apart images, typically called frames. Presently, there are two primary classes of video coders: frame-based coders and object based coders. In both types of coders, the temporal sequence is comprised of discrete time samples coinciding with each frame, and the data at each time sample is an image. Frame-based and object based coders differ in that object based coders operate on arbitrary shaped objects in the video scene, whereas frame-based coders operate on the entire frame. Object based coders attempt to exploit the coherence of objects in the frames by coding these objects separately. This may involve simply coding a foreground object, such as talking head, separately from a mostly static background. It also may involve more complicated scenes with multiple video objects. An object based coder can be reduced to a frame based coder by treating each frame as a single object. Examples of video coding standards for frame based video encoding include MPEG-2 and H262-H263. The coding standard MPEG-4 addresses object based video coding.

While remote prediction may be used in both frame based and object based video coding, the following example illustrates remote prediction in the context of object based video coding.

Figure 5:
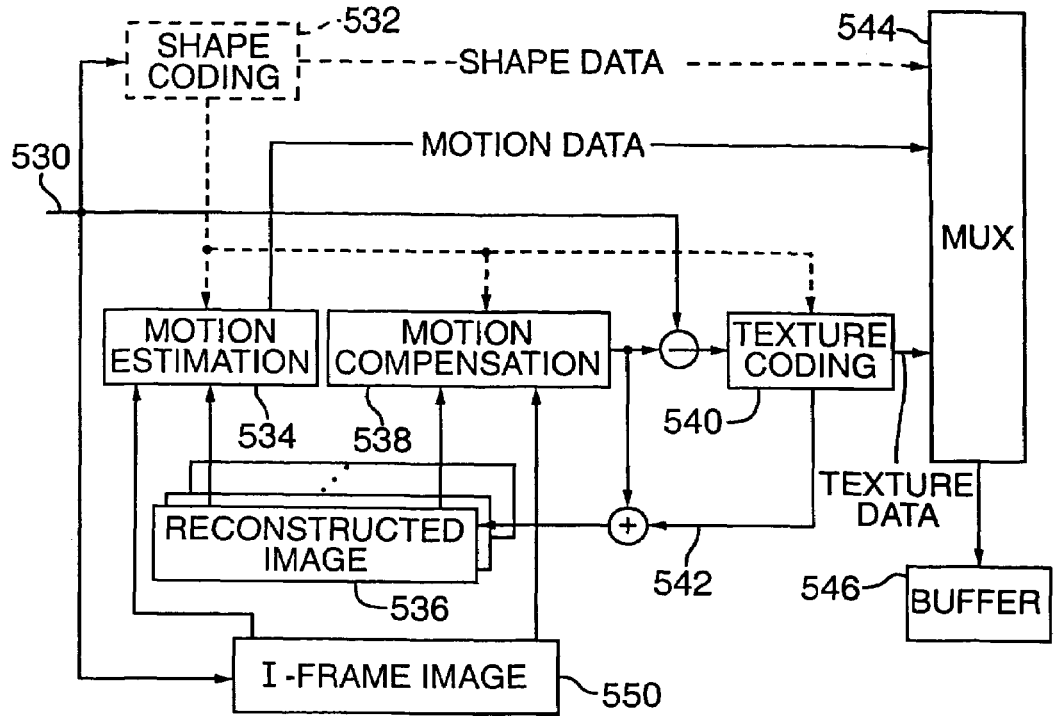
FIG. 5 is a block diagram of an object-based video encoder that incorporates the prediction-based coding scheme of the invention.

FIG. 5 is a block diagram illustrating an implementation of an object-based video encoder that supports remote prediction. The encoder modules shown in FIG. 5 operate on an input stream of frames, after a pre-processing stage has segmented the frames into objects and has classified each object as an I, P, or R unit. The input 530 to the encoder includes images representing the video objects in each frame, the shape of each video object and bounding rectangles. The shape information is available before the encoder codes texture or motion data. Frame-based coding differs in that the entire frame is coded without shape information, and the input 530 simply consists of a series of image frames, each classified as R, I, or P frames.

The shape coding module 532 reads the definition of an object including its bounding rectangle and extends the bounding rectangle to integer multiples of fixed sized pixel blocks called "macroblocks." The shape information for an object comprises a mask or "alpha plane." The shape coding module 532 reads this mask and compresses it, using for example, a conventional chain coding method to encode the contour of the object.

Motion estimation module 534 performs motion estimation between an object in the current frame and its reference object. This reference object is the same object in either the immediately preceding frame for P type data, or the same object in the first frame of the current segment, for R type data. The encoder stores the immediately preceding object as the reconstructed image 536, and stores the object from the first frame in the segment as part of the I-frame image memory 550. The motion estimation module 534 reads the appropriate object from either memory space 536 or 550 based on a parameter that classifies the type of the object as either an R or P type. Using the stored image object and its bounding rectangle, the motion estimation module computes motion estimation data used to predict the motion of an object from the current frame to the reference frame.

In the implementation, the motion estimation module 534 searches for the most similar macroblock in the reference image for each macroblock in the current image to compute a motion vector for each macroblock. The specific format of the motion vector from the motion estimation module 534 can vary depending on the motion estimation method used. In the implementation, there is a motion vector for each macroblock, which is consistent with current MPEG and H26X formats. However, it is also possible to use different types of motion models, which may or may not operate on fixed sized blocks. For example, a global motion model could be used to estimate the motion of the entire object, from the current frame to the reference frame. A local motion model could be used to estimate the motion of sub-regions within the object such as fixed blocks or variable sized polygons. The particular form of motion estimation is not critical to the invention.

Returning again to FIG. 5, the motion compensation module 538 reads the motion vectors computed by the motion estimation module and the previously reconstructed image 536 or the I frame image 550 and computes a predicted image for the current frame. Each pixel in the predicted image is constructed by using the motion vector for the macroblock that it resides in to find the corresponding pixel in the previously reconstructed image 536, for P type data, or the I frame image, for R type data. The encoder then finds the difference between the image sample values in the input image block as specified in the input 530 and the corresponding sample values in the predicted image block as computed in the motion compensation module 538 to determine the error signal for each macroblock.

Texture coding module 540 compresses blocks of error signals for inter-frame coded objects, namely, R and P type objects. In addition, it compresses blocks of image sample values for the object from the input data stream 530 for intra-frame coded objects, namely the I type objects. The feedback path 542 from the texture coding module 540 represents blocks of signals that were texture coded and then texture decoded, including the reconstructed error signal and I-frame object. The encoder uses the error signal blocks along with the predicted image blocks from the motion compensation module to compute the reconstructed image 536. The reconstructed image memory 536 shown in FIG. 5 includes multiple memory units to reflect that more than one reference image may be needed to support multiple levels of R type units, the current reconstructed I type unit, and the current P type unit.

The texture coding module 540 codes intra-frame and error signal data for an object using any of a variety of still image compression techniques. Example compression techniques include DCT, wavelet, as well as other conventional image compression methods.

The bit stream of the compressed video sequence includes the shape, motion and texture coded information from the shape coding, motion estimation, and texture coding modules. In addition, it includes overhead parameters that identify the type of coding used at the frame, object, and macroblock levels. Depending on the implementation, the parameter designating the data type as I, R, or P can be encoded at any of these levels. In the implementation, the encoder places a flag at the macroblock level to indicate which type of data is encoded in the macroblock. Multiplexer 544 combines and formats the shape, motion, texture, and overhead parameters into the proper syntax and outputs it to the buffer 546. The multiplexer may perform additional coding of the parameters. For example, overhead parameters and the motion vectors may be entropy coded, using a conventional entropy coding technique such as Huffman or arithmetic coding.

While the encoder can be implemented in hardware or software, it is most likely implemented in software. In a software implementation, the modules in the encoder represent software instructions stored in memory of a computer and executed in the processor, and the video data stored in memory. A software encoder can be stored and distributed on a variety of conventional computer readable media. In hardware implementations, the encoder modules are implemented in digital logic, preferably in an integrated circuit. Some of the encoder functions can be optimized in special-purpose digital logic devices in a computer peripheral to off-load the processing burden from a host computer.

Figure 6:
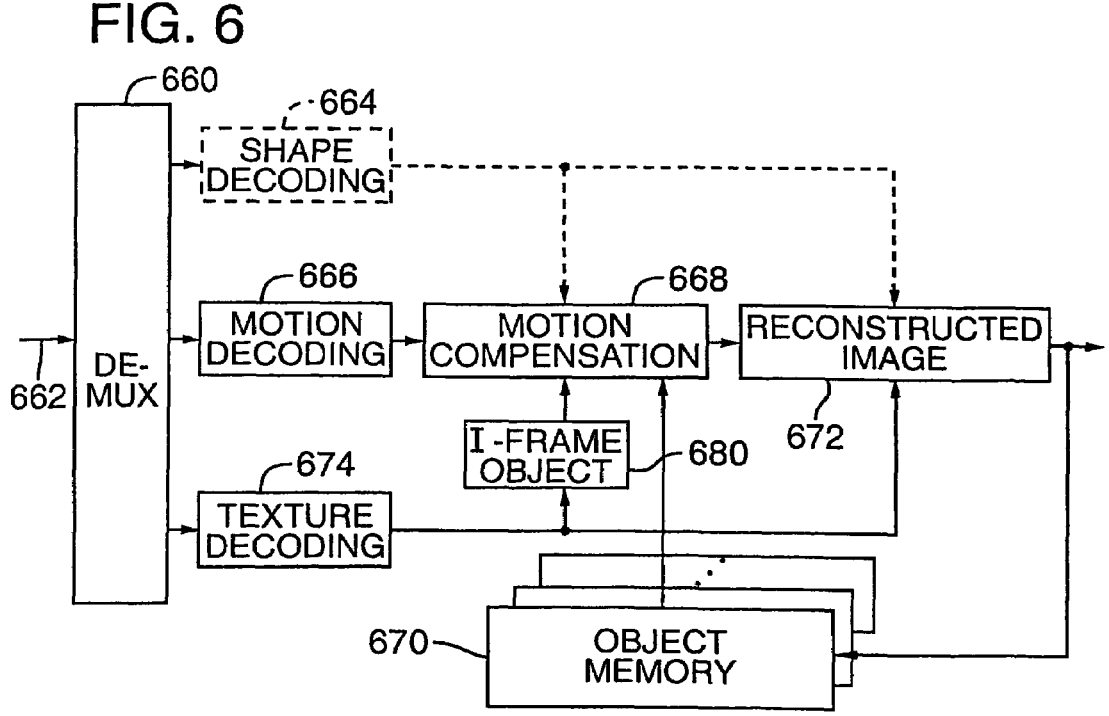
FIG. 6 is a block diagram of an object-based video decoder that is compatible with the prediction-based coding scheme shown in FIG. 5.

FIG. 6 is a block diagram illustrating a decoder for an object-based video coding method. A demultiplexer 660 receives a bit stream 662 representing a compressed video sequence and separates shapes, motion and texture encoded data on an object by object basis. The demultiplexer also includes a mode selector to indicate whether the macroblocks are I, P, or R type.

Shape decoding module 664 decodes the shape or contour for the current object being processed. To accomplish this, it employs a shape decoder that implements the inverse of the shape encoding method used in the encoder of FIG. 5. The resulting shape data is a mask, such as a binary alpha plane or gray scale alpha plane representing the shape of the object.

The motion decoding module 666 decodes the motion information in the bit stream. The decoded motion information includes the motion vectors for each macroblock that are reconstructed from entropy codes in the incoming bit stream. The motion decoding module 666 provides this motion information to the motion compensation module 668. The motion compensation module 668 uses the motion vectors to find predicted image samples in the previously reconstructed object data 670 for P type macroblocks and higher level R type macroblocks, or the I-frame object memory 680 for first level R type macroblocks.

The texture decoding module 674 decodes error signals for inter-frame coded texture data (both R and P type) and an array of color values for intra-frame texture data (I type data) and passes this information to a module 672 for computing and accumulating the reconstructed image. It specifically stores the I frame data objects in separate memory 680 so that the motion compensation module can compute the predicted object for first level R type objects using the I frame's object rather than the immediately preceding frame's object. For inter-frame coded objects, including both R and P type data, this module 672 applies the error signal data to the predicted image output from the motion compensation module 668 to compute the reconstructed object for the current frame. For intra-frame coded objects, the texture decoding module 674 decodes the image sample values for the object and places the reconstructed object in the reconstructed object module 672 and I-frame object memory 680. Previously reconstructed objects are temporarily stored in object memory 670 and are used to construct the object for other frames.

Like the encoder, the decoder can be implemented in hardware, software or a combination of both. In software implementations, the modules in the decoder are software instructions stored in memory of a computer and executed by the processor, and video data stored in memory. A software decoder can be stored and distributed on a variety of conventional computer readable media. In hardware implementations, the decoder modules are implemented in digital logic, preferably in an integrated circuit. Some of the decoder functions can be optimized in special-purpose digital logic devices in a computer peripheral to off-load the processing burden from a host computer.

Classifying R Type Data Units

In a coding system that supports remotely predicted data units, the encoder preferably classifies each data unit as an I, R, or P type unit for encoding. There are a variety of ways of implementing the classification scheme. One approach is to implement the encoder so that it always uses the same spacing of I, R, and P data units. Another approach is to allow the user to specify the spacing by making the spacing of each type a user adjustable parameter. Yet another approach is to program the encoder to classify the data units in the stream adaptively or dynamically based on some criteria determined during the encoding process. A scheme for adaptively classifying data units refers to a process in which the encoder selects the data type by adapting it to some characteristic of the media content or some other criteria relating to the coding of the media content or its transmission. The term "dynamic" is similar to "adaptive" and is meant to apply to implementations where data unit type is selected at run-time (during operation) of the encoder or during transmission of the stream.

The classification of data unit types may be dynamic or predetermined based on the media content type. The encoder may determine the spacing of I and R units in the stream based on a predetermined relationship between the media content type and the spacing of I and R units. The encoder, for example, may be programmed to use a default spacing of R units for all video sequences of a certain type. In particular, the encoder might use a first default spacing of R units for low motion talking head video and a second, different spacing for high motion video scenes. The encoder may allow the user to specify a different spacing for the content via a user-adjustable input parameter.

One form of dynamically classifying data units is to select the spacing of I, P and R type units in the stream based on a prediction error threshold. For example, the encoder can be programmed to start a new independent segment with an I type unit when the error signal from the prediction process exceeds a predetermined or user-adjustable threshold. In this case, the encoder may be programmed to classify selected data units in between each I unit in the sequential stream as R type units according to a predetermined or user-adjustable spacing. The encoder would classify the remaining data units as P type units.

Another measure of data transfer reliability is an indicator of the quantity of data being lost for previously transferred data packets over the communication channel (such as network data packets). The encoder could also obtain this information from the channel interface. In particular for computer networks, the network interface software would keep track of the dropped data packets. The encoder could then query the interface to request that it return the number of lost packets. The encoder would then calculate or adjust the spacing of R units for each independent segment based on a predetermined relationship between the number of lost data packets over a period of time and the spacing of R units.

Another form of dynamically classifying data units is to select the spacing of R type units based on a measure of the fidelity of the output stream at the client. One approach is to use the magnitude of the prediction error as a measure of the fidelity. The magnitude of the prediction error can be used to select coding between R and P type data units on the server.

As demonstrated above, there are a number of ways to control the classification of the data unit types. An implementation of the invention may use one or more of these methods, or some alternative method. Note, that in general, the R units may be classified independently from the I units. In other words, the spacing of the R units may be selected so as to be totally independent of the spacing of I units. Thus, the encoder can optimize the spacing of R units depending on a variety of criteria independent of the need for random access points.

Prioritizing Data Units

As introduced above, the encoder implementation may also prioritize the transfer of I, P, and R encoded data units with respect to the reliability of the data transfer. Preferably, the encoded stream should be prioritized such that the I unit has the highest reliability of being transferred, the R unit has the same or lower reliability as the I unit, and the P unit has the same or lower probability as the R unit. Additionally, if the encoder implements a multi-layered R encoding scheme, the priority for each level $R_n$ would decrease. For example, units of type $R_1$, dependent on the I unit in the segment, would have the highest priority, units of type $R_2$, dependent on unit of type $R_1$ in the sub-segment, would have the next highest priority.

The implementation prioritizes data transfer by transmitting the higher priority data units first so that there is more time to retransmit them if they are not received. Once prioritized, the encoded data units maintain that priority level on retransmission. In particular, all higher priority data units are transmitted, including retransmissions if necessary, before lower priority data units.

The implementation of the prioritizing scheme operates in conjunction with an underlying transport mechanism that supports prioritization of data transfer based on some predetermined block of data (e.g., a packet). The encoder instructs the transport mechanism to place higher priority data in higher priority data packets for transfer, and ensures that these higher priority packets are successfully transmitted before instructing the transport mechanism to send the next lower priority data unit types. This process of sending all data units of a certain type in prioritized fashion operates on a portion of the input data stream, such that all of the I type units in that portion are sent first, then all of the $R_1$ type units in that portion, then all of the $R_2$ units in that portion, and so on. Preferably, the size of this portion is set so as not to add significant latency on the client side. For example, the size of the portion size may be set as 10 seconds worth of data units in a video stream. If the size of the portion becomes larger, the client incurs additional latency waiting for receipt of the portion, before it is able to start reconstructing the stream.

This approach for prioritizing the transfer of the encoded stream helps to ensure that any losses will affect the P unit first, before affecting the R or I units. As a result, the client is more likely to receive the most useful information, namely the independent data units, which provide random access and data recovery, and the higher priority R type units, which provide additional data recovery points.

The prioritization scheme works in the case of a transfer between a server and a single client, and in a multi-cast scenario where a server broadcasts the data packets to multiple clients. The extent to which the client uses the encoded units to reconstruct the output depends on its available transmission bandwidth. In the case of a multi-cast application, the client can subscribe to the number of priority levels that it can support based on its available bandwidth. Consider an example such as FIG. 2B where the data stream is encoded with multiple layers of R units, and the units in each layer are dependent on the R unit in a lower level sent with higher priority. Also, consider the case where the frame rate of the R units designated in the input stream doubles with each level of hierarchy. In particular, the highest priority R units, $R_1$, are inserted so as to double the frame rate relative to the I units, the next highest priority R units, $R_2$, are inserted so as to double the frame rate relative to the $R_1$ units, and so on.

Depending on the bandwidth available to the client, it can subscribe to however many levels it wants, with each level providing better fidelity yet increasing the bandwidth requirements. By sending all units of a given priority level in a portion of the stream first, this approach sacrifices the lower priority units to make sure that the higher priority units will be received.

Brief Overview of a Computer System

Figure 7:
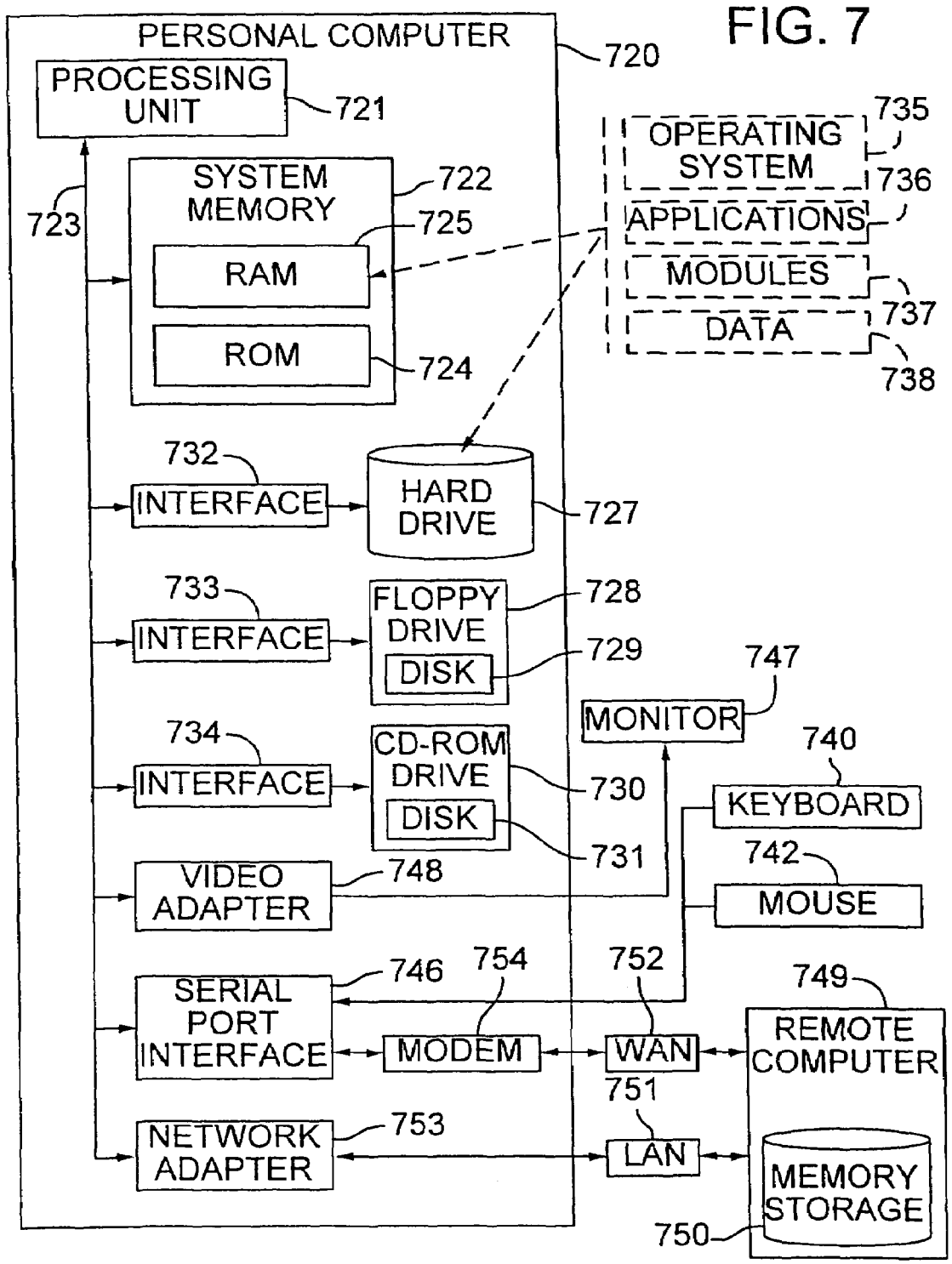
FIG. 7 is a block diagram of a computer system used to execute a software implementation of the invention.

FIG. 7 and the following discussion are intended to provide a brief, general description of a suitable computing environment in which the invention may be implemented. Although the invention or aspects of it may be implemented in a hardware device, the encoder and decoder described above are implemented in computer-executable instructions organized in program modules. The program modules include the routines, programs, objects, components, and data structures that perform the tasks and implement the data types described above.

While FIG. 7 shows a typical configuration of a desktop computer, the invention may be implemented in other computer system configurations, including hand-held devices, multiprocessor systems, microprocessor-based or programmable consumer electronics, minicomputers, mainframe computers, and the like. The invention may also be used in distributed computing environments where tasks are performed by remote processing devices that are linked through a communications network. In a distributed computing environment, program modules may be located in both local and remote memory storage devices.

FIG. 7 illustrates an example of a computer system that serves as an operating environment for the invention. The computer system includes a personal computer 720, including a processing unit 721, a system memory 722, and a system bus 723 that interconnects various system components including the system memory to the processing unit 721. The system bus may comprise any of several types of bus structures including a memory bus or memory controller, a peripheral bus, and a local bus using a bus architecture such as PCI, VESA, Microchannel (MCA), ISA and EISA, to name a few. The system memory includes read only memory (ROM) 724 and random access memory (RAM) 725. A basic input/output system 726 (BIOS), containing the basic routines that help to transfer information between elements within the personal computer 720, such as during start-up, is stored in ROM 724. The personal computer 720 further includes a hard disk drive 727, a magnetic disk drive 728, e.g., to read from or write to a removable disk 729, and an optical disk drive 730, e.g., for reading a CD-ROM disk 731 or to read from or write to other optical media. The hard disk drive 727, magnetic disk drive 728, and optical disk drive 730 are connected to the system bus 723 by a hard disk drive interface 732, a magnetic disk drive interface 733, and an optical drive interface 734, respectively. The drives and their associated computer-readable media provide nonvolatile storage of data, data structures, computer-executable instructions (program code such as dynamic link libraries, and executable files), etc. for the personal computer 720. Although the description of computer-readable media above refers to a hard disk, a removable magnetic disk and a CD, it can also include other types of media that are readable by a computer, such as magnetic cassettes, flash memory cards, digital video disks, Bernoulli cartridges, and the like.

A number of program modules may be stored in the drives and RAM 725, including an operating system 735, one or more application programs 736, other program modules 737, and program data 738. A user may enter commands and information into the personal computer 720 through a keyboard 740 and pointing device, such as a mouse 742. Other input devices (not shown) may include a microphone, joystick, game pad, satellite dish, scanner, or the like. These and other input devices are often connected to the processing unit 721 through a serial port interface 746 that is coupled to the system bus, but may be connected by other interfaces, such as a parallel port, game port or a universal serial bus (USB). A monitor 747 or other type of display device is also connected to the system bus 723 via an interface, such as a display controller or video adapter 748. In addition to the monitor, personal computers typically include other peripheral output devices (not shown), such as speakers and printers.

The personal computer 720 may operate in a networked environment using logical connections to one or more remote computers, such as a remote computer 749. The remote computer 749 may be a server, a router, a peer device or other common network node, and typically includes many or all of the elements described relative to the personal computer 720, although only a memory storage device 750 has been illustrated in FIG. 7. The logical connections depicted in FIG. 7 include a local area network (LAN) 751 and a wide area network (WAN) 752. Such networking environments are commonplace in offices, enterprise-wide computer networks, intranets and the Internet.

When used in a LAN networking environment, the personal computer 720 is connected to the local network 751 through a network interface or adapter 753. When used in a WAN networking environment, the personal computer 720 typically includes a modem 754 or other means for establishing communications over the wide area network 752, such as the Internet. The modem 754, which may be internal or external, is connected to the system bus 723 via the serial port interface 746. In a networked environment, program modules depicted relative to the personal computer 720, or portions thereof, may be stored in the remote memory storage device. The network connections shown are merely examples and other means of establishing a communications link between the computers may be used.

CONCLUSION

While the invention has been illustrated using a specific implementation as an example, the scope of the invention is not limited to the specific implementation described above. In particular, the use of remote prediction scheme for improved error recovery is not limited to video, but instead, applies to other media streams as well. For example, the same techniques described above can be applied to audio, where the data units are frames of audio and there is a dependency relationship among the audio frames. In audio coders available today, an audio frame corresponds to a fixed number of PCM samples in the time domain. When an audio frame is made to be dependent on another audio frame, whether it is a dependency between audio signals or audio coding parameters (e.g., the parameters in a parametric coding model in speech), remote prediction can be used to improve error recovery in the manner described above. In particular one or more layers of R units may be inserted to improve loss recovery.

The data dependency graph of the encoded data stream may vary as well. For example, the independent data unit does not have to be at the beginning of an independent segment of data units. For example, the independent unit may be located in the middle of a temporal sequence of data units in an independent segment, rather than at the beginning of the segment. The other predicted units in the segment would be predicted directly or indirectly from the I unit. Note that the only restriction is that the I unit be available for decoding the other units in the segment that depend on it. This constraint can be satisfied by prioritizing the transfer of the data units such that the I unit is available for decoding the dependent units.

As a practical matter, the I unit will likely be at the beginning of an ordered, temporal sequence of data units in an independent segment of the stream for most applications because the receiver usually will need to play it first before the other units in the segment. However, with the use of a prioritization scheme that re-arranges the data units for transmission, there is flexibility in the classification of the data units as I, P, and R units.

Also, as noted above, the remotely predicted data units can use another R type unit as their reference, rather than the I unit in the segment. Rather than maintaining a copy of the I data unit, the coder/decoder would keep a copy of the previously reconstructed R unit in addition to the previously reconstructed P unit. The coding scheme described above could be extended to a multi-layered coding scheme where there are multiple levels of R type units. Each level may be dependent directly on the I unit in the segment, or on other R units, which in turn, are dependent on other R units or the I unit in the segment.

In view of the many possible implementations of the invention, it should be recognized that the implementation described above is only an example of the invention and should not be taken as a limitation on the scope of the invention. Rather, the scope of the invention is defined by the following claims. We therefore claim as our invention all that comes within the scope and spirit of these claims.

We claim:

1. In a computing device that implements a video encoder, the computing device including a processor and memory, a method of encoding video data streams in encoded form, the method comprising:
   with the computing device that implements the video encoder, determining a type value for a unit of video data in a video image, wherein the type value is one of plural possible type values including an intra type value, a first single-unit single-reference inter-prediction type value, and a second single-unit single-reference inter-prediction type value;
   when the type value for the unit is the intra type value, with the computing device that implements the video encoder, encoding at least some of the video data for the unit using an intra encoding mode including intra encoding;
   when the type value for the unit is the first single-unit single-reference inter-prediction type value, with the computing device that implements the video encoder, encoding at least some of the video data for the unit using a first inter encoding mode that favors quality at the expense of decoding flexibility for a given bitrate, wherein the encoder uses at most one motion vector and one reference identifier per block in the first inter encoding mode;
   when the type value for the unit is the second single-unit single-reference inter-prediction type value, with the computing device that implements the video encoder, encoding at least some of the video data for the unit using a second inter encoding mode different than the first inter encoding mode, wherein the second inter encoding mode favors decoding flexibility at the expense of quality for the given bitrate, and wherein the encoder also uses at most one motion vector and one reference identifier per block in the second inter encoding mode;
   with the computing device that implements the video encoder, entropy encoding the type value for the unit; and
   with the computing device that implements the video encoder, outputting part of a bitstream, the outputted part indicating the type value for the unit, wherein the type value for the unit is in encoded form in the bitstream.

2. The method of claim 1 wherein the unit is less than the entire video image.

3. The method of claim 1 further comprising, for the first and second inter encoding modes, with the computing device that implements the video encoder:
   selecting from among plural reference images; and
   outputting one or more additional parts of the bitstream, the outputted one or more additional parts indicating one or more reference identifiers for motion compensation.

4. The method of claim 3 wherein for at least one block of the unit the encoder uses one motion vector and one reference identifier and for at least one block of the unit the encoder uses one motion vector and no reference identifier.

5. The method of claim 1 wherein the determining the type value includes choosing the type value based at least in part upon a user selectable parameter for balancing quality and loss recovery.

6. The method of claim 1 wherein the determining the type value includes choosing the type value based at least in part upon packet loss information from a communications channel.

7. The method of claim 1 wherein the determining the type value includes choosing the type value based at least in part upon media content type.

8. The method of claim 1 wherein, according to the first inter encoding mode and according to the second inter encoding mode, the encoder performs motion compensation in a single temporal direction.

9. In a computing device that implements a video encoder, the computing device including a processor and memory, a method of encoding video data including plural units, wherein each of the plural units is for video data in one video image, the method comprising:
   for each of the plural units:
      with the computing device that implements the video encoder, determining a type value for the unit, wherein the type value is one of plural possible type values, the plural possible type values including an intra type value, a first single-unit single-reference inter-prediction type value, and a second single-unit single-reference inter-prediction type value;
      when the type value for the unit is the intra type value, with the computing device that implements the video encoder, encoding at least some of the video data for the unit using an intra encoding mode;
      when the type value for the unit is the first single-unit single-reference inter-prediction type value, with the computing device that implements the video encoder, encoding at least some of the video data for the unit using a first inter encoding mode that favors quality at the expense of decoding flexibility for a given bitrate, wherein the encoder uses at most one motion vector and one reference identifier per block in the first inter encoding mode;
      when the type value for the unit is the second single-unit single-reference inter-prediction type value, with the computing device that implements the video encoder, encoding at least some of the video data for the unit using a second inter encoding mode, wherein the encoder also uses at most one motion vector and one reference identifier per block in the second inter encoding mode, wherein the second inter encoding mode differs from the first inter encoding mode, and wherein the second inter encoding mode favors decoding flexibility at the expense of quality for the given bitrate;

with the computing device that implements the video encoder, entropy encoding the type value for the unit; and with the computing device that implements the video encoder, outputting part of a bitstream, the outputted part indicating the type value for the unit, wherein the type value for the unit is in encoded form in the bitstream;

wherein, for the first and second inter encoding modes, the encoder selects from among plural reference images and outputs one or more additional parts of the bitstream, the outputted one or more additional parts indicating one or more reference identifiers for motion compensation.

10. The method of claim 9 wherein at least one of the plural units is less than an entire video image.

11. The method of claim 9 further comprising, with the computing device that implements the video encoder, updating the plural reference images, including adding a current image to the plural reference images and removing a previous image from the plural reference images.

12. The method of claim 9 wherein for at least one block of the unit the encoder uses one motion vector and one reference identifier and for at least one block of the unit the encoder uses one motion vector and no reference identifier.

13. The method of claim 9 wherein the determining the type value includes choosing the type value based at least in part upon media content type.

14. The method of claim 9 wherein the determining the type value includes choosing the type value based at least in part upon packet loss information from a communications channel.

15. The method of claim 9 wherein, according to the first inter encoding mode and according to the second inter encoding mode, the encoder performs motion compensation in a single temporal direction.

16. In a computing device that implements a video encoder, the computing device including a processor and memory, a method of encoding video data, the method comprising:

with the computing device that implements the video encoder, determining a type value for a unit of the video data, wherein the type value is one of plural possible type values, the plural possible type values including an intra type value, a first single-unit single-reference inter-prediction type value, and a second single-unit single-reference inter-prediction type value;

when the type value for the unit is the intra type value, with the computing device that implements the video encoder, encoding at least some of the video data for the unit using intra encoding;

when the type value for the unit is the first single-unit single-reference inter-prediction type value, with the computing device that implements the video encoder, encoding at least some of the video data for the unit using a first inter encoding mode that favors quality at the expense of decoding flexibility for a given bitrate, wherein the encoder uses at most one motion vector and one reference identifier per block in the first inter encoding mode;

when the type value for the unit is the second single-unit single-reference inter-prediction type value, with the computing device that implements the video encoder, encoding at least some of the video data for the unit using a second inter encoding mode different than the first inter encoding mode, wherein the encoder also uses at most one motion vector and one reference identifier per block in the second inter encoding mode, and wherein the second inter encoding mode favors decoding flexibility at the expense of quality for the given bitrate;

with the computing device that implements the video encoder, entropy encoding the type value for the unit; and with the computing device that implements the video encoder, outputting part of a bitstream, the outputted part indicating the entropy coded type value for the unit, wherein the type value for the unit is in encoded form in the bitstream.

17. The method of claim 16 wherein the unit is less than an entire video image.

18. The method of claim 16 wherein, for the first and second inter encoding modes, the encoder selects from among plural reference images and outputs one or more reference identifiers for motion compensation.

19. The method of claim 16 wherein for at least one block of the unit the encoder uses one motion vector and one reference identifier and for at least one block of the unit the encoder uses one motion vector and no reference identifier.

20. The method of claim 16 wherein the determining the type value includes choosing the type value based at least in part upon packet loss information from a communications channel.

21. The method of claim 16 wherein the determining the type value includes choosing the type value based at least in part upon magnitude of prediction error.

22. The method of claim 16 wherein, according to the first inter encoding mode and according to the second inter encoding mode, the encoder performs motion compensation in a single temporal direction.

* * * * *